United States Patent [19]
Hollins

[11] 3,830,327
[45] Aug. 20, 1974

[54] HEADLIGHT CONTROL SYSTEM
[76] Inventor: Jesse R. Hollins, 40 Stoner Ave., Great Neck, N.Y. 11021
[22] Filed: Nov. 28, 1972
[21] Appl. No.: 309,992

[52] U.S. Cl. .............................. 180/82 R, 240/41.6
[51] Int. Cl. ............................................ B60q 1/10
[58] Field of Search ....... 180/82 R; 240/8.1 R, 8.25, 240/41.6, 61.1

[56] References Cited
UNITED STATES PATENTS
| 1,368,430 | 2/1921 | Gould | 240/41.6 |
| 1,752,349 | 4/1930 | Menningen | 240/41.6 |
| 2,107,443 | 2/1938 | Jimenez | 240/41.6 |
| 2,225,981 | 12/1940 | Casson | 240/61.1 |
| 3,402,287 | 9/1968 | Hindman | 240/61.1 X |
| 3,614,416 | 10/1971 | Fleury | 240/8.25 |
| 3,617,731 | 11/1971 | Fleury | 240/8.25 |
| 3,643,082 | 2/1972 | Fleury | 240/8.25 |

Primary Examiner—David Schonberg
Assistant Examiner—Terrance L. Siemens

[57] ABSTRACT

A system for controlling the tilting of the headlights on a vehicle. In one embodiment the tilting of the headlights is adjusted to compensate for sagging of the rear of the vehicle. In another embodiment means is provided for controlling the tilting of single filament headlights so that a "high tilt" or "low tilt" beam aim can be selectively achieved.

6 Claims, 4 Drawing Figures

HEADLIGHT CONTROL SYSTEM

BACKGROUND OF THE INVENTION

1. Field of the Invention

A system for controlling the tilting of the headlights on a motor vehicle

2. Description of the Prior Art

Nearly all states have requirements with respect to aiming of passenger vehicle headlights. Usually a check is made of the aiming of vehicle headlights when the vehicle is brought to an inspection station for its annual inspection. The headlights are turned on and measurements are taken to ascertain that the beams are correctly aimed.

In nearly all instances, the measurements are taken when the vehicle is unloaded, i.e., when there are no passengers in the vehicle. If the vehicle is loaded with passengers on the rear seat, the rear of the vehicle body sags on the vehicle body springs. Obviously, the more passengers that sit on the rear seat, the more pronounced the sagging of the rear of the vehicle. The sagging just described results, in addition to the rear of the vehicle body dipping downwardly, in the front of the vehicle body pointing upwardly. If the vehicle trunk is loaded, the sagging of the rear of the vehicle body and upward pointing of the vehicle front is more pronounced. Additionally, if a trailer is attached to the rear bumper of the vehicle, the weight of the front section of the trailer and the load carried thereon causes the rear of the vehicle body to sag.

As will be apparent to those having ordinary skill in the art, when the front of the vehicle body is tilted upwardly, the headlights are tilted upwardly so as to change the direction of the beams produced from that when the vehicle is unloaded. This problem is further compounded in that passenger vehicles nowadays have extremely flexible springs to create a smooth ride. As a result thereof, the sagging of the rear of the vehicle and the upward tilting of the front thereof can be substantial.

One of the problems caused by the front of the vehicle being tilted upwardly is that the beams produced by the headlights are very frequently directed in the line of vision of the driver of an approaching vehicle. The undesirableness of this is apparent and in extreme cases blinding of the driver can occur causing an accident. A further disadvantage in having the front of the vehicle tilted upwardly is that the beams produced by the headlights are not as efficient in producing light as when the beams are properly aimed. This makes night driving more hazardous since it reduces the driver visibility.

Vehicles are equipped with headlights having two filaments; one of the filaments being for the high beam and the other being for the low beam. Present motor vehicle laws require vehicle operators to drive after dark with the low beam filaments in operation in all urban areas and on the highway when approaching an oncoming vehicle or when following another vehicle. The sealed headlight bulbs are designed with the high beam on a focal point and the optics of the lens and the reflector are designed with respect to this focal point. The low beam is off focal point causing the reflector and the optics of the lens to be relatively inefficient with respect to the light output of the low beam filament. In actuality, very frequently the rays emitted by the low beam filament do not conform with the designed optical beam pattern.

A further drawback of having a headlight with a high beam filament and a low beam filament is that the only way for the driver to be sure whether the high beam filament or the low beam filament is on is to check the high beam indicator light on the dash panel. This is because frequently the driver is unaware whether he is operating the vehicle with the high beam filament or the low beam filament in operation. Due to the smallness in size of the indicator light on the dash panel, it is sometimes difficult for the driver to readily see the indicator light to ascertain which filaments are operating and this is particularly so when the vehicle is operating at high speeds, at which time it is most necessary for him to maintain constant forward vision.

SUMMARY OF THE INVENTION

1. Purposes of the Invention

It is an object of the present invention to provide an improved headlight system for motor vehicles.

Still another object of the present invention is to provide an improved headlight system on a motor vehicle wherein sagging of the rear of the vehicle will not change the direction of the beam of light of the headlights in relation to the roadway.

Yet another object of the present invention is to provide an improved motor vehicle headlight system wherein the tilting of the front vehicle headlights is automatically controlled in response to load conditions.

Another object of the present invention is to provide an improved headlight system for motor vehicles wherein each headlight includes one filament.

Another object of the present invention is to provide an improved headlight system for a motor vehicle wherein the vehicle headlights each include one filament and means is provided for controlling the tilting of the beams produced by the headlights.

A further object of the present invention is to provide systems capable of achieving each of the above and other objects and which will be reliable in operation as well as being economical to manufacture.

2. Brief Description of the Invention

According to the present invention, the foregoing as well as other objects are achieved in one embodiment of the present invention by using a fluid pulsator unit which is attached to a passenger vehicle body adjacent and in front of the differential housing, said differential housing being affixed to the vehicle rear wheels. The pulsator includes a first piston and a first cylinder. A piston control member is attached to the differential housing and when the rear of the vehicle sags, the pulsator unit moves downwardly and the first piston abuts the piston control member so that the first piston moves up relative to the first cylinder and generates a fluid pressure.

A second piston in a second cylinder is located at the front of the vehicle and is in fluid communication with the pulsator unit. A first spring biases the second piston to a first position. Movable with the second piston is a cam which controls the tilting of the motor vehicle headlights. The motor vehicle headlights are secured to a pivotable frame. Secured to said frame is a cam follower and a spring biases said cam follower and frame to a position so that the beams produced by the headlights are properly aimed for the unloaded vehicle.

When the rear of the vehicle sags the piston control member causes the first piston to move relative to the first cylinder to generate a fluid pressure. This causes the second piston to overcome the spring acting thereon, moving the cam so the cam follower is moved in a direction resulting in the frame and the headlights secured thereto rotating to tilt the headlights slightly downwardly to compensate for the rear of the vehicle sagging.

Other embodiments of the invention are hereinafter described and for purposes of brevity have not been set forth herein.

Other obects of the invention will in part be apparent and in part will be pointed out hereinafter.

The invention accordingly consists in the features of construction, combination of elements, and arrangement of parts which will be exemplified in the systems hereinafter described and of which the scope of application will be indicated in the appended claims.

DESCRIPTION OF THE PREFERRED EMBODIMENTS

Figure 1:
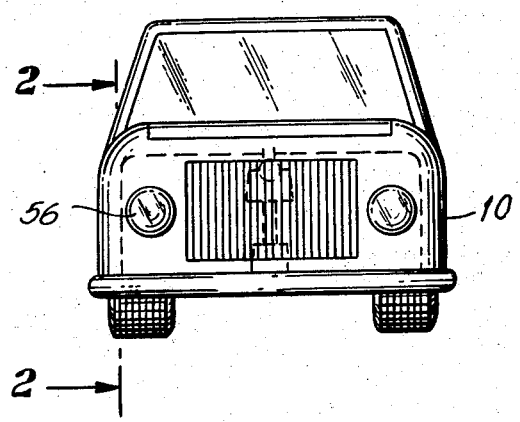
FIG. 1 is a front plan view of a motor vehicle utilizing a first embodiment of the present invention.
Figure 2:
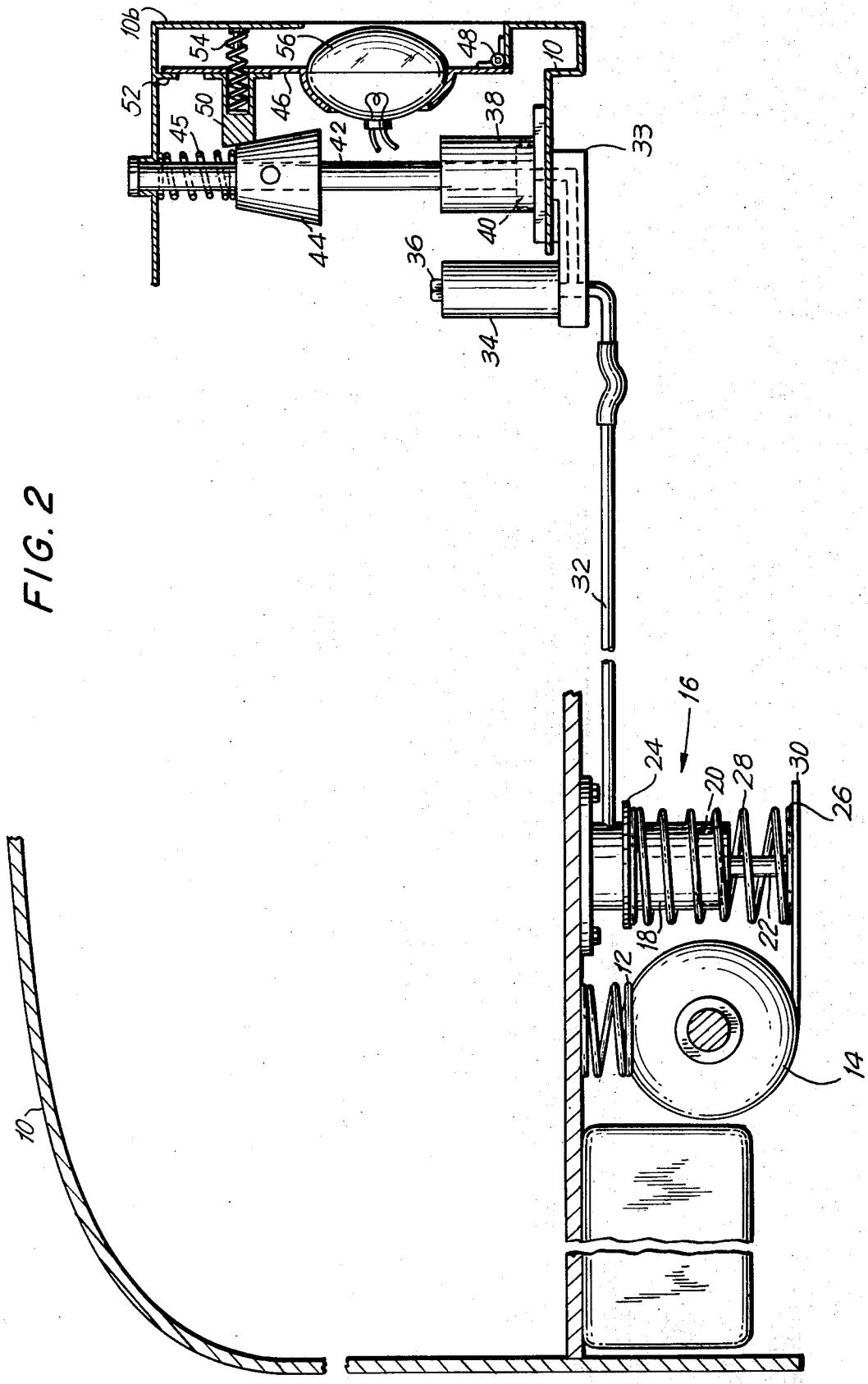
FIG. 2 is a sectional view taken substantially along the line 2—2 illustrating schematically a first embodiment of the present invention.

In FIGS. 1 and 2 of the drawings a passenger motor vehicle body 10 is shown which includes a rear body support spring 12 and a differential housing 14, said differential housing being secured to the rear vehicle wheels. As will be apparent to those having ordinary skill in the art, the structure just described is conventional. Secured to the vehicle underbody 10 adjacent differential housing 14, but slightly to the front thereof, is a fluid pulsator unit 16 which consists of a fluid cylinder 18 secured to vehicle body 10. Fluid cylinder 18 is secured to vehicle underbody so as to be substantially vertical when the vehicle is in an unloaded condition. Movable within cylinder 18 is a piston 20 having a rod 22 which extends through the bottom of cylinder 18. It is noted that an air vent is provided at the bottom of cylinder 18 beneath piston 20 so as to enable the piston to freely move in an upward direction without creating a vacuum and to move in a downward direction as required.

Secured about the upper exterior of cylinder 18 below the top thereof is a spring stop 24. Secured to the bottom of piston rod 22 is a further spring stop 26 which is parallel to spring stop 24. It is noted that spring stops 24 and 26 are parallel and in registry with each other. It is further noted that each of the spring stops is a cross-section larger than the outside cross-section of cylinder 18.

A compression spring 28 having two ends surrounds a portion of cylinder 18 and rod 22. A first end of spring 28 abuts stop 24 and the remaining end of spring 28 abuts stop 26. Affixed to differential housing 14 and extending horizontally and forwardly thereof is a piston rod stop plate 30. When the vehicle is unloaded piston rod stop plate 30 cooperates with spring stop 26 as will hereinafter be described.

A conduit 32 is in fluid communication with a port located at the uppermost portion of cylinder 18, and runs along the under portion of vehicle body 10 to the front thereof.

A full fill fluid reservoir 34 having a removable plug 36 is in fluid communication with conduit 32. Fluid conduit 32 is also in communication via a fluid conducting block 33 with a fluid cylinder 38 which is affixed to a cylinder mount on the vehicle body at the front thereof. A passageway in the cylinder mount communicates block 33 to cylinder 38. Movable in fluid cylinder 38 is a piston 40 having a rod 42 extending through the upper end of cylinder 38. The upper portion of cylinder 38 is in communication with ambient to allow piston 40 to move vertically within the cylinder 38 under the influence of surges in fluid pressure in line 32 created by pulsator 16, as will hereinafter be described.

Secured to the upper portion of rod 42 is a cam 44 with rod 42 extending through cam 44 and through an opening in vehicle body 10. A compression spring 45 surrounds rod 42 above cam 44 and biases piston 40 to its lowermost position, that is, in contact with the bottom of cylinder 38. A lamp frame 46 is pivotally secured at its bottom portion to a hinge 48 which is secured to vehicle body 10. A portion 10b of vehicle body 10 is in front of the upper segment of frame 46, said frame extending between the left and right side of the motor vehicle. Secured to the upper portion of frame 46 is a cam follower 50. Frame stop 52 extends downwardly from vehicle body 10 and limits the counterclockwise movement of frame 46. A compression spring 54 is secured at one end to cam follower 50 and at its other end to portion 10b of vehicle body 10 so that said frame is biased to its position of maximum counter clockwise movement, which is limited by abutment with stop 52.

Right side headlight 56 is secured to frame 46, it being appreciated that the left side headlight is likewise secured to frame 46. While one right side headlight is shown in the drawings this is for purposes of illustration, and if desired, a dual right side headlight system could be utilized and similarly a dual left side headlight.

When the embodiment of the present invention shown in FIG. 1 is utilized without any load being applied to cause the motor vehicle body to sag, spring 28 has maximum expansion with piston 20 abutting the bottom of cylinder 18. There is a slight gap between stop 26 and piston stop bar 30, or, if desired, these two elements can be in light contact with each other. Spring 45 is in a state of maximum expansion with piston 40 at the bottom of cylinder 38. Spring 54 maintains frame 46 in its position of maximum counter clockwise movement, so that the frame is in abutment with stop 52 and cam 44 does not affect the positions of follower 50 and frame 46. With this orientation of frame 46 the vehicle headlights are properly aimed.

When the vehicle body sags in a rearward direction, that is to say, when the rear of the vehicle drops cylinder 18 moves downwardly with stop 26 abutting plate 30 so that piston 18 moves upward relative to the cylinder and forces fluid from the cylinder. The fluid forced from cylinder 18 passes through conduit 32 to cylinder 38 elevating piston 40 against the bias of spring 45. Consequently, cam 44 is elevated abutting cam follower 50, causing the same to swing to the right as viewed in FIG. 2 against the bias of spring 54. Lamp frame 46 is moved in a clockwise direction about hinge 48, so that the vehicle front headlights are tilted downwardly with respect to their previous orientation. Thus, even though the rear of the vehicle body is sagging the headlights are not elevated to cause the disadvantages noted in the description of the prior art, supra.

When the load is removed from the vehicle body, the rear of the body rises and levels. Cylinder 18 rises and spring 28 acting on stop 26 lower piston 20 relative to cylinder 18. The piston is lowered until stop 26 lightly abuts plate 30 or is spaced therefrom by a small amount. The bias of spring 45 moves piston 40 to the bottom of cylinder 38. Fluid is transferred from cylinder 38 via conduit 32 to cylinder 18. Spring 54 maintains lamp frame 46 in its position of maximum counterclockwise rotation so that the vehicle headlights are properly aimed.

If desired, instad of having lamp frame 46 extend substantially for the width of the motor vehicle with the left headlights and right headlights secured thereto, the lamp frame can be wide enough solely to accommodate the right headlight. A bar can be provided which rotates when the lamp frame rotates. A second lamp frame is provided at the left side of the front of the vehicle for pivotal movement with the bar and the left headlight is secured thereto. The stop structure described in FIG. 1 for limiting the position of lamp frame 46 need not be duplicated for the left lamp frame since the left lamp frame moves simultaneously and in synchronization with the right lamp frame which will have the needed stop structure. While cam 44 has been shown as having a truncated cross-section which increases in a downward direction, and follower 50 as having an inclined left side for contact with cam 44 which slopes downward and to the right, this is for purposes of illustration. Any type of cam and follower arrangement could be used as long as when the cam is elevated the follower proportionately moves to the right.

The amount of fluid entering cylinder 38 when the rear of the vehicle body sags is a function of the amount of sag and by choosing the appropriate size cylinder-piston units, the proper cam and follower arrangement, the lamp frame will be appropriately positioned for different amounts of sagging of the rear of the vehicle body.

Sagging of the front of the vehicle body does not cause the headlights to tilt upwardly and thus need not be corrected for.

Any conventional hydraulic liquid can be used in the system.

Figure 3:
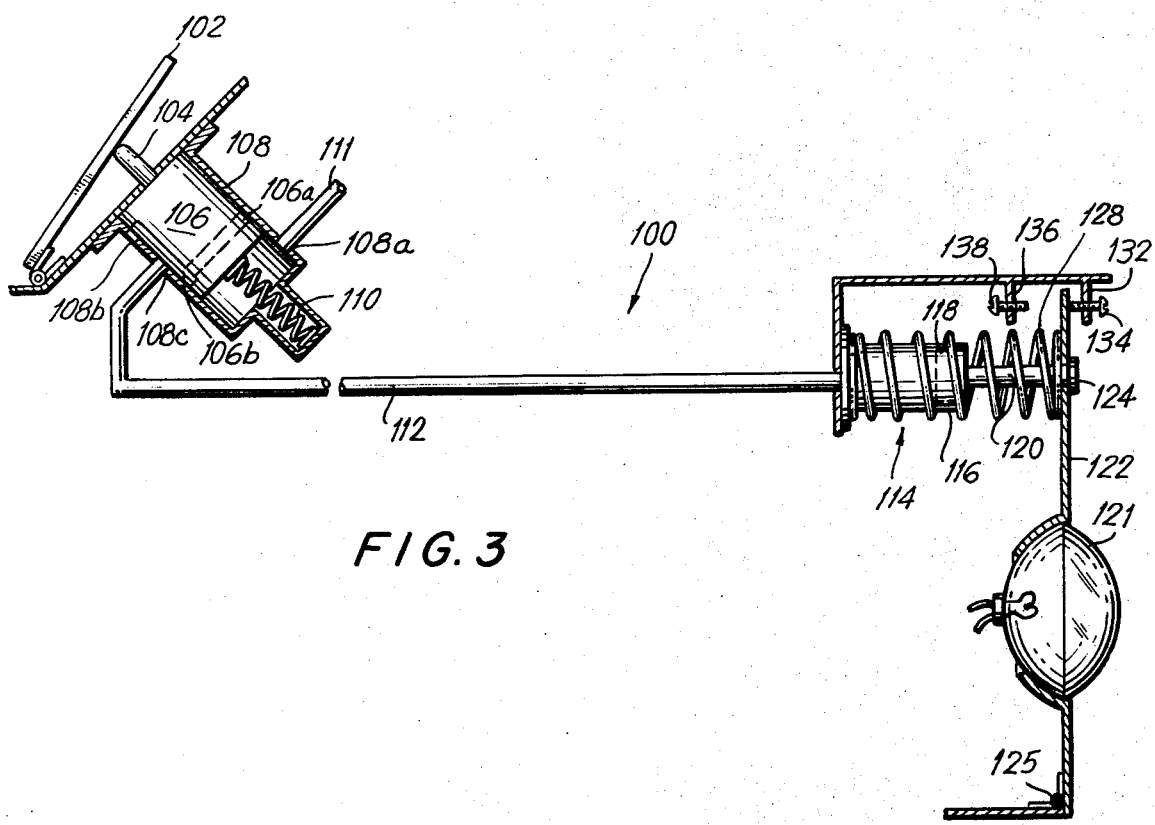
FIG. 3 is a schematic illustration of a second embodiment of the present invention.

In FIG. 3 of the drawings a further embodiment 100 of the present invention is shown. A pivoted foot pedal 102 is provided on the vehicle floor board to the left of the brake pedal (or the clutch pedal if there is one). Projecting through the vehicle floor board is a valve spool post 104 which controls the orientation of a valve spool 106 which is affixed thereto. Valve spool 106 is movable in valve sleeve 108 and a spring 110 biases valve spool 106 to the upper end of sleeve 108, as shown in FIG. 3.

Valve sleeve 108 includes a vacuum port 108a to which a vacuum tube 111 is communicated. Vacuum tube 111 leads to the engine intake manifold which operates at sub-atmospheric pressure during engine operation, as will be apparent to those having ordinary skill in the art. Sleeve 108 also includes a port 108b which is in communication with ambient. A third sleeve port 108c is in communication with a conduit 112 which leads to a piston and cylinder arrangement 114 which will hereinafter be described. Valve spool 106 includes an annular notch 106a and a cut-away 106b. When the valve is in its upper position shown in FIG. 3, ports 108b and 108c are in communication with each other via cut-away 106b. When valve spool 106 is in its lower position ports 108a and 108c are in communication with each other via notch 106a.

Piston and cylinder arrangement 114 includes cylinder 116 which is substantially horizontal and affixed to the vehicle body adjacent to the rear of the headlights. Cylinder 116 includes a port at its left end which conduit 112 is in communication with. Movable in cylinder 116 is a piston 118 which includes a piston rod 120 that extends through the right end of cylinder 116. A frame 122 is pivotally connected by a hinge 125 to the vehicle body. Rod 120 extends through frame 122 and attached to the free end of the rod is a stop 124.

A compression spring 128 which includes two ends has one end abutting a stop attached to the vehicle body where cylinder 116 is affixed thereto, and the remaining end in abutment with lamp frame 122.

The right side headlight 121 is affixed to frame 122 which spans the vehicle width as is the left side vehicle light which is not shown in FIG. 3. It is to be appreciated that the vehicle headlights have a one filament bulb and do not have the high beam and low beam filaments which characterize present headlights. Affixed to the vehicle body and to the right of the uppermost portion of frame 122 is a flange 132. An adjustable screw 134 extends through flange 132 and limits the clockwise movement of lamp frame 122 for the orientation of lamp frame 122 shown in the FIGs. In a similar manner a flange 136 is affixed to the vehicle body and an adjustable screw 138 extends therethrough through and limits the maximum counter clockwise movement of lamp frame 122.

In using the embodiment shown in FIG. 2, with no pressure applied to pedal 102, spool 106 under the bias of spring 110 is in a position so that ports 108b and 108c are in communication with each other. As a consequence, atmospheric pressure is applied to the left end of cylinder 116 and spring 128 is fully expanded so that frame member 122 is in its position of maximum clockwise rotation and in abutment with screw 134. In this position of frame 122 the vehicle headlights are in a "low tilt" position.

When it is desired to move the headlights to "high tilt," pedal 102 is depressed abutting post 104 and moving spool 106 compressing spring 110. Ports 108a and 108c are placed in communication with each other so that conduit 111 is in communication with conduit 112 and piston 118 is drawn to the left of cylinder 116 compressing spring 128. Stop 124 pulls frame 122 in a counterclockwise direction until said frame abuts screw 138. The vehicle front headlights are now in a position of "high tilt" and will remain so as long as sufficient pressure is applied to pedal 102. When pressure is removed from pedal 102, spring 110 moves valve spool 106 to a position that ports 108b and 108c are in communication, and atmospheric pressure is applied, via conduit 112, to cylinder 116. When this occurs, spring 128 expands moving frame member 122 in a clockwise direction until the same abuts screw 134.

The advantage of this system is that when the driver does not apply foot pressure on pedal 102, the headlights are in "low tilt" position, and only as long as sufficient pressure is applied to said pedal are the headlights in a "high tilt" position. Thus the driver is always aware of the position of the headlights without having to check an indicator light on the dashboard.

One of the advantages of using a single filament headlight is that the optics of the reflector and lens can be designed for the single filament which will always be in focus, thus overcoming the problem in prior art dual filament headlights where the optics of the headlight were designed for the high beam and thus the low beam was not efficiently focused.

Figure 4:
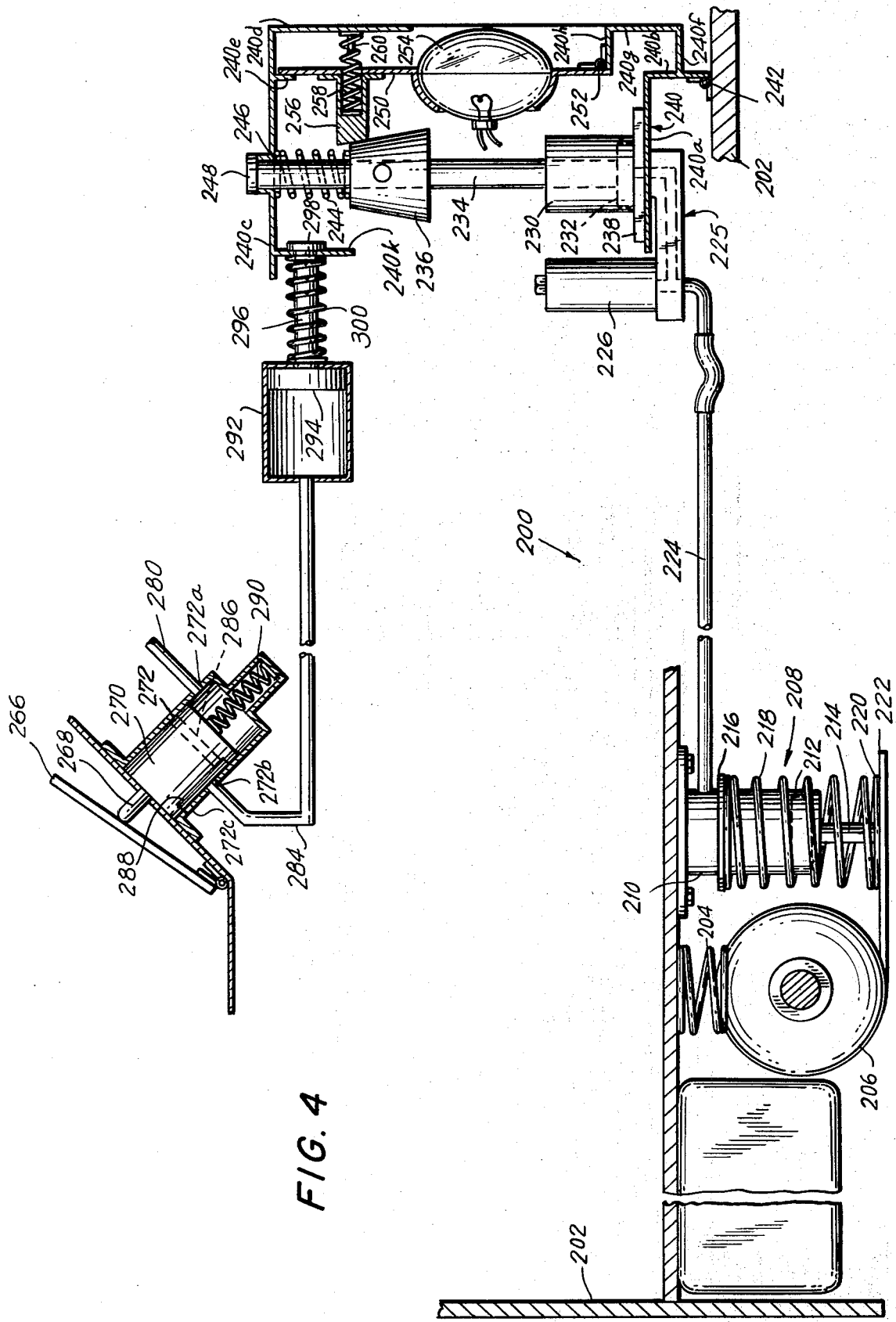
FIG. 4 is a schematic illustration of a third embodiment of the present invention.

In FIG. 4 of the drawings an embodiment 200 of the present invention for use on a motor vehicle is shown. Embodiment 200 is a combination of the first two embodiments of the invention and includes a vehicle body 202. Vehicle body 202 includes a rear body support spring 204 and a differential housing 206. Affixed to the vehicle underbody is a pulsator 208 which consists of a cylinder 210 with a piston 212 housed therein. Cylinder 210 is affixed to the front of differential housing 206 and is substantially vertical. Secured to piston 212 is a rod 214 which extends through the bottom portion of said cylinder. A first spring stop 216 surrounds and is secured to cylinder 210 adjacent the upper portion thereof. A second spring stop 220 is secured to the bottom of rod 214. A compression spring having two ends encircles a portion of cylinder 210 and rod 214 with one end of said spring in abutment with stop 216 and the other end in abutment with stop 220.

A rod stop plate 222 is secured to differential housing 206 and is positioned beneath stop 220 and operates in a manner that will hereinafter be described. A conduit 224 is in fluid communication with the upper portion of cylinder 210 and leads to a fluid conducting block 225 located at the front of the motor vehicle. A full fill reservoir 226 is provided and in communication with conduit 224 via a passageway in block 225. A passageway located in block 225 communicates conduit 224 to a port located in the bottom of a cylinder 230. Housed within cylinder 230 is a piston 232 having a rod 234 which extends through the uppermost portion of said cylinder. Cylinder 230 is secured to a cylinder mount 238 with the fluid being transferred to said cylinder through a passageway in said mount. Secured to piston rod 234 is a cam 236 which is identical to cam 44.

Cylinder mount 238 is affixed to a bracket 240 and specifically to a horizontal segment 240a thereof. Depending vertically downwardly from horizontal segment 240a of bracket 240 is a vertical segment 240b which is secured via a hinge 242 to vehicle body 202.

Bracket 240 includes an upper horizontal portion 240c which is parallel to portion 240a. Depending downwardly from the rightmost segment of upper horizontal portion 240c is a vertical portion 240d. Spaced to the rear of portion 240d of bracket 240 and part of said bracket is a frame stop 240e which is parallel to portion 240d. An opening extends through the upper horizontal portion 240c of bracket 240 and the upper portion of rod 234 extends therethrough. A stop 248 is integral with the upper portion of rod 234 located above upper horizontal portion 240c. If desired, as shown in the drawings, a rim can be provided about the segment of upper horizontal portion 240c which defines opening 246 so that the uppermost portion of piston rod 234 can slide therethorugh.

A compression spring 244 having two ends encircles the portion of piston rod 234 above cam 236 and below the upper horizontal portion 240c of bracket 240. One end of compression spring 244 abuts the upper portion of cam 236 and the remaining end of said compression spring abuts upper horizontal portion 240c of bracket 240. Extending frontwardly from the approximate mid-segment of vertical portion 240b of bracket 240 is a horizontal portion 240f with a vertical portion 240g extending upwardly therefrom. A horizontal portion 240h of said bracket extends inwardly a short distance from the upper portion of vertical portion 240g. A lamp frame 250 is secured by a hinge 252 to the innermost segment of portion 240h of bracket 240. Secured to headlight frame 250 is a right single filament headlight 254. Lamp frame 250 extends for the width of the vehicle and the left headlight utilizing a single filament is secured thereto. Alternatively, the lamp frame can be sufficiently wide so as to secure only the right headlight and a bar bar can be attached thereto and extend across the front of the vehicle for controlling the movement of a similar frame to which is secured the left headlight which has a single filament.

The upper portion of lamp frame 250 abuts stop 240e as shown in FIG. 4 during an unloaded condition of the vehicle body. Secured to frame 250 is a cam follower 256 which is identical to cam follower 50 and cooperates with cam 236 in the same manner that follower 50 and cam 44 cooperate with each other. A compression spring 258 which is identical to compression spring 54 biases follower 256 in contact with cam 236 and includes a forward end which surrounds a spring stop bar 260 secured to portion 240d of bracket 240.

A pedal 266 is provided adjacent the vehicle clutch pedal, or if there is not clutch pedal adjacent the brake pedal. Projecting through the floorboard is a post 268 to which is secured a valve spool 270 slideable in a valve sleeve 272. Valve sleeve 272 includes ports 272a, 272b and 272c. A conduit 280 places port 272a in communication with the intake manifold of the motor vehicle. Port 272c is in communication with the ambient. Valve spool 270 includes an annular notch 286 and a cutaway 288. A compression spring 290 biases valve spool 270 to the position seen in FIG. 4 in which position cutaway 288 places ports 272c and 272b in communication with each other. A conduit 284 is in communication with port 272b and leads to a cylinder 292 which is affixed to the vehicle body. Located in cylinder 292 is a piston 294 and a rod 296 is secured thereto and extends through an opening in the right end of cylinder 292. Integral with upper horizontal portion 240c of bracket 240 is a depending vertical headlight tilt control 240k. Headlight tilt control 240k includes an opening through which rod 296 extends and secured to the portion of rod 296 extending past said opening is a stop 298. A compression spring 300 is provided and includes two ends while encircling rod 296. One end of compression spring 300 abuts cylinder 292 and the other end thereof abuts headlight tilt control 240k.

If the rear of the vehicle is not sagging, spring 218 maintains stop 220 and piston 212 in their lowermost positions so that no fluid under pressure is forced through conduit 224. As a consequence piston 232 is in its lowermost position and cam 236 does not move follower 256 and lamp frame 250 in a clockwise direction to tilt the headlights downwardly. Compression spring 258 maintains lamp frame 250 in abutment with stop 240e. If no pressure is applied to pedal 266, spool 270 is in the position seen in FIG. 4 so that ports 272c and 272b are in communication with each other via a cutaway 288. Atmospheric pressure is applied via conduit 284 to cylinder 292. Spring 300 is in its position of maximum expansion with bracket 240 positioned so that stop 240e abuts lamp frame 250 and the lamp frame positions the headlights in the "low tilt" position.

If the rear of the vehicle sags, pulsator 208 supplies pressurized fluid via conduit 244 to cylinder 230 elevating piston 232. Pulsator 208 supplies pressurized fluid to conduit 230 in the same way that pulsator 16 supplies pressurized fluid to cylinder 38 for the rear of a vehicle sagging as described in connection with FIG. 2. Cam 236 is elevated abutting follower 256 so that the follower and lamp frame 250 move in a clockwise direction about hinge 252 from their previous position to compensate for the sagging at the rear of the motor vehicle. As previously described, the amount of pressurized fluid generated by pulsator 208 is dependent on the amount of sagging of the rear of the vehicle and increased amounts of sag result in increased amounts of fluid being transferred to conduit 224 and corresponding increases in the amount of elevation of piston 232. The greater the elevation of piston 232 the more that lamp frame 250 is moved in a clockwise direction to increase the downward tilting of the headlights to compensate for the increases sag of the rear of the motor vehicle.

If the operator wishes to have the headlights aimed for "high tilt" with the rear of the vehicle sagging, pedal 266 is depressed moving spool 270 so that ports 272a and 272b are in communication with each other via annular notch 286. As a consequence thereof, conduits 280 and 284 are placed in communication with each other and a subatmospheric pressure is applied to cylinder 292. The subatmospheric pressure applied to cylinder 292 pulls piston 294 to the left thereof overcoming the bias of spring 300. The movement of piston 294 to the left causes stop 298 to move headlight tilt control 240k to the left so that bracket 240 moves in a counter clockwise direction about hinge 242. The rotation of bracket 240 in a counter clockwise direction moves cam 236 in a leftward direction and stop 240e in a leftward direction. Lamp frame 250 under the bias of spring 258 moves in a counter clockwise direction with follower 256 abutting cam 236. The headlights will be maintained in the "high tilt" position as long as pedal 266 is depressed.

The removal of pressure from pedal 266 results in an atmospheric pressure being applied to cylinder 292. Spring 300 moves piston 294 to the right end of cylinder 292 and bracket 240 rotated in a clockwise direction about hinge 242 with the limit of said movement being determined by the abutment of piston 294 with the right end of cylinder 292. As a consequence thereof, bracket 240 and frame 250 move in a clockwise direction so that headlights are no longer in the "high tilt" position but are aimed slightly downwardly from their normal position to compensate for the sagging at the rear of the vehicle. If the sagging at the rear of the vehicle ceases, piston 232 travels to the bottom of cylinder 230 under the bias of spring 244 and spring 258 swings lamp frame member 250 into abutment with stop 240e so that the headlights are correctly aimed.

If the operator of the vehicle should decide to place the headlights in a "high tilt" position, pedal 266 is depressed and bracket 240 is swung in a counterclockwise direction about hinge 242 so that stop 240e and cam 236 are swung in the counter clockwise direction. Lamp frame 250 swings in a counter clockwise direction under the bias of spring 258 until same frame member abuts stop 240e. The removal of pressure from pedal 266 enables spring 300 to swing bracket 240 in a clockwise direction so that the headlights will no longer be in a "high tilt" position. The advantages noted by using a single filament headlight as set forth in connection with the second embodiment of the present invention are obviously applicable to the third embodiment as are the advantages set forth in connection with the first embodiment of the present invention for controlling the tilting of the headlights in response to sagging of the rear of the vehicle body.

It thus will be seen that there are provided headlight control systems which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. A system for controlling the aiming of the headlights on a motor vehicle in accordance with the sag of the rear of the motor vehicle body comprising a vehicle body, a member pivotally movable with respect to said vehicle body and substantially perpendicular to the ground upon which the vehicle body is supported, a first headlight movable with said member, a second headlight movable with said member, a first cylinder affixed to said vehicle body, a first piston located in said first cylinder, a spring stop being fixed relative to said vehicle body, a rod secured to said first piston and extending externally of said first cylinder, a spring having two ends and abutting said spring stop at one end, a stop plate, said motor vehicle including a vehicle frame, said stop plate affixed to said vehicle frame, the remaining end of said spring abutting said stop plate, said stop plate being substantially parallel to the ground on which the vehicle body is supported, a second cylinder affixed to said vehicle body, a second piston located in said second cylinder, a second piston rod secured to said second piston and extending externally from said second cylinder, a cam secured to said second piston rod, a cam follower secured to said pivotal member and in contact with said cam, means directly communicating said first cylinder to said second cylinder, means biasing said cam and hence said second piston rod in a downward direction, means limiting the pivotal movement of said member whereby the position of said member will be varied as said vehicle body sags.

2. A system according to claim 1 wherein each headlight includes a single filament.

3. A system according to claim 2 wherein means is provided for selectively moving said pivotal member to a position corresponding to the headlights being in a high tilt orientation and to a position where the headlights are in a low tilt orientation.

4. A system for controlling the position of the headlights on a vehicle body comprising a vehicle body, a member pivotally secured to said vehicle body, a first headlight movable with said member, a second headlight movable with said member, said first and second headlights being spaced from each other and each having a single filament, means for limiting the pivotal movement of said member in a first direction, means for limiting the pivotal movement of said member in a second direction which is counter to the first direction, a cylinder secured to the vehicle body, a piston located in said cylinder, a rod secured to said piston and extending externally thereof, means for moving said member in the first direction when the rod is moved in one direction and for moving said member in the second direction when the rod is moved in a direction opposite to the one direction, a servo valve, said servo valve connected to a source of fluid energy and to an atmospheric reservoir, means connecting said servo valve to said cylinder, said servo valve having a first position wherein said piston and rod are in a first position and said servo valve having a second position wherein said piston and rod are in a second position, said member being in a first position when said rod is in its first position and in a second position when said rod is in its second position, said headlights being in a high tilt orientation only when said member is in the second position, means for baising said servo valve to its first position and operator control means for overcoming the bias of said biasing means for moving said servo valve to its second position.

5. A system accoridng to claim 4 wherein said operator control means includes a foot pedal.

6. A system according to claim 4 wherein means is provided for controlling the orientation of said member in accordance with the sagging of the rear of the vehicle body.

* * * * *